2,874,712

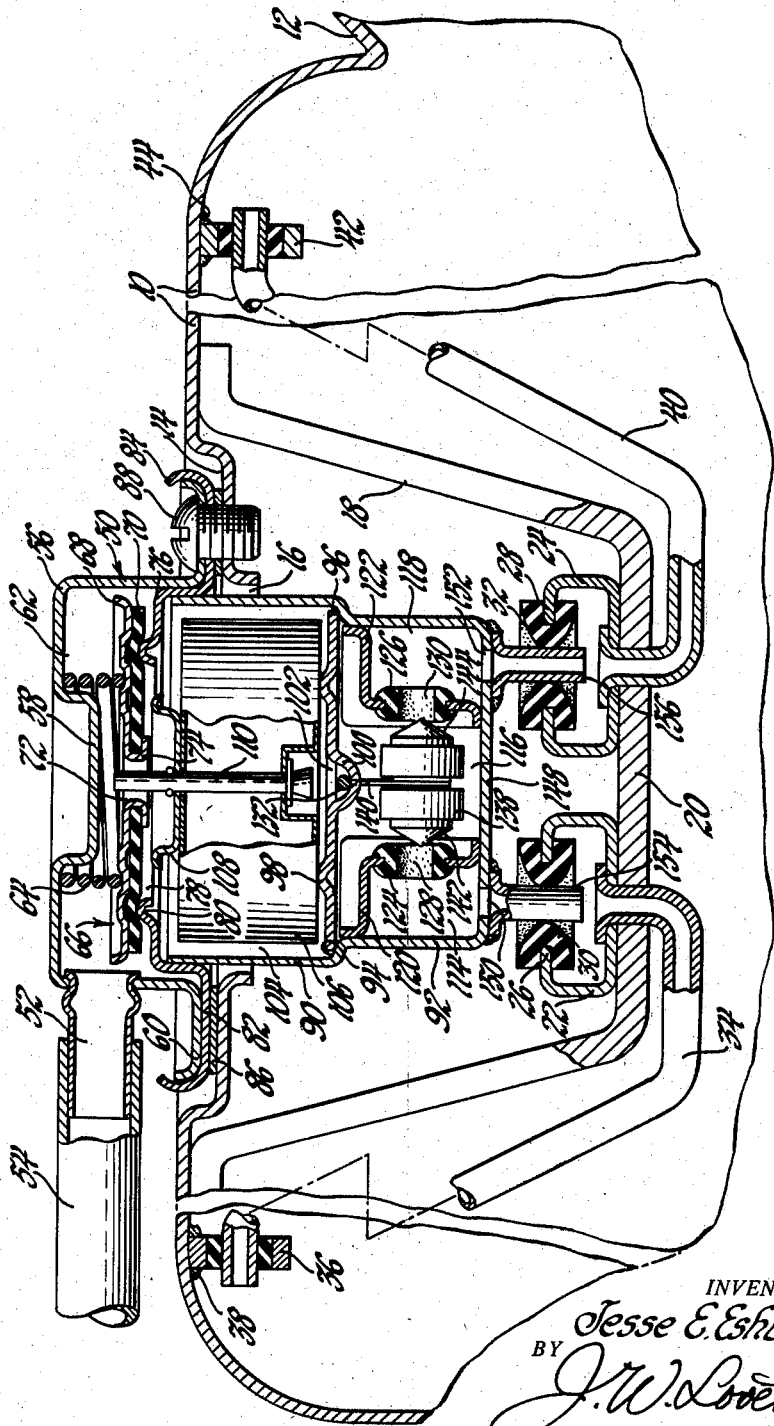

TANK VENT STRUCTURES

Jesse E. Eshbaugh, Flint, Mich., assignor to General Motors Corporation, Detroit, Mich., a corporation of Delaware Application November 21, 1955, Serial No. 548,069

4 Claims. (Cl. 137—43)

This invention relates to vent structures for tanks and more particularly to vent structures as applied to fuel tanks as employed on automotive vehicles.

In locating the filler spout of a fuel tank at the rear of a vehicle instead of at the side thereof in order to make the spout as conveniently accessible as possible from either side, a difficulty arises in venting the tank. This is because the spout and its cap must be located in a low position to clear the conventional rear trunk cover when the latter is being raised or lowered. Lowering of the spout necessitates a tight unvented spout cover or cap particularly when the vehicle is ascending a steep grade. The spout cover not giving a vent necessitates the provision of some other vent device which may take the form of an undesirable extraneous structure such as a supplementary tank communicating with the fuel tank. Venting is necessary to permit conventional withdrawal of the fuel from the tank by pump action so that the fuel supply to the engine carburetor is not interfered with. If the tank is operated under positive pressure conditions or under pump suction, it is also necessary to provide means for releasing excessive pressure of vapor which frequently occurs under high temperature conditions. It is obvious, of course, that in the use of any tank structure the loss of fuel should be prevented insofar as possible.

An object of the present invention is to provide an improved vent structure which is capable of venting a tank regardless of the angle of inclination the surface of the liquid in the tank may be caused to assume with respect to the tank for any period of time.

Another object is to provide an improved vent structure for a tank in which the filler spout and its cap may be placed at a lower elevation with respect to the tank and in which the vent structure is included within the tank.

To these ends, a feature of the present invention is an ancillary tank vented to the ambient air and depending within the main tank and including valve means movably mounted and effective to close off the vent structure from one side of the main tank when the latter is inclined from a normal position.

Another feature is an ancillary tank provided with pendulum type valve means positioned to vent a main tank despite inclination of the latter from a normal position.

Another feature is an ancillary tank containing vent structure and spaced conduit means leading to opposite zones of a main tank, the conduit means including resilient grommets effecting demountability of the ancillary tank from the main tank.

These and other important features of the invention will now be described in detail in the specification and then pointed out more particularly in the appended claims.

The drawing depicts a sectional elevational view of the top portion of a fuel tank employing a vent structure in which the present invention is embodied. A fuel or main tank 10 is shown which is suitable for use in an automobile and, as mounted on such a vehicle, the tank is provided with a filler spout partially shown at 12 for positioning at the rear of the vehicle. It will be understood that this spout extends upwardly a short distance and is adapted to be closed by means of a suitable cover or cap in fluid tight fashion. A central portion of the tank top is depressed as at 14 to form a marginal area around an opening 16 leading into the tank. A U-shaped strap 18 is fixed to the underside of the top of the tank by welding or otherwise in such a way that a horizontal portion 20 thereof is beneath the opening 16. Preferably, this strap lies in a plane extending forwardly on the vehicle and away from the spout 12. Two spaced cups 22 and 24 are supported by the horizontal portion 20 of the strap 18 and each of these cups bears an annular inturned flange 26 or 28 to retain resilient rubber grommets 30 or 32 respectively. The cup 22 communicates by means of a conduit 34 with a forwardly located top zone within the tank 10. The forward end of the conduit 34 is detachably held in a suitable support bracket 36 welded as at 38 to the tank. A similar conduit 40 for the cup 24 communicates with the rear top zone of the tank 10 and is supported in a bracket 42 welded as at 44 to the tank. The spaced conduits 34 and 40 may, therefore, be said to extend into spaced or opposite zones of the tank 10.

Depending within the opening 16 and extending into the tank is an ancillary tank generally indicated at 50 which is vented to the ambient atmosphere by means of a nipple 52 and a suitable conduit 54 attached thereto. This conduit extends to a position suitably elevated as will be understood. The ancillary tank 50 includes an inverted cup 56 having a central depressed portion 58 and an outturned annular flange 60. The cup 56 defines a top chamber 62 in which is enclosed a coil spring 64 centered by the depressed portion 58. This spring bears down upon a valve member which includes a rigid disc 68 faced by a disc 70 of soft sealing material. The disc 68 is centrally ported or vented as at 72 in a hub structure 74 retaining the sealing disc 70 in place on the disc 68.

The ancillary tank 50 also includes an inner cup member 76 forming a horizontal partition having a central large opening 78 defined by a circular ridge 80. The latter forms a seat for the soft disc 70. The cup 76 bears an outwardly turned annular flange 82 with its outer margin curved upwardly and inwardly as at 84 to retain the flange 60 of the cup 56. A sealing washer 86 is provided between the flange 82 and the depressed portion 14 of the tank 10. A number of screws such as screw 88 are employed to hold the flanges 60 and 82 and the washer 86 in fluid tight relation with the tank 10.

The ancillary tank 50 also includes a depending tank portion 90 which extends down through the opening 16 and is fixed by means of welding to the inside of the inner cup 76. The tank portion 90 bears a reduced cylindrical portion 92 so that an interior shoulder 94 is formed upon which rests a circular disc 96. This disc is provided with an annular arrangement of upstanding dimples or knobs 98 and two depending and spaced ears 100. The latter are so formed from the disc 96 that an opening 102 is made in the disc. Normally supported or resting upon the knobs 98 and within the secondary chamber 104 defined within the ancillary tank 50 above the disc or partition 96 is a float 106 which is fixed together with a valve member 108 to a vertical stem 110. The upper end of this stem extends through the port 72 and terminates short of the horizontal depressed wall 58.

The interior of the lower or reduced portion of the ancillary tank 50 is divided into three compartments 114, 116 and 118 by means of wall members 120 and 122. The latter are pierced to accommodate two resilient rubber annular members 124 and 126 bearing horizontal passages 128 and 130 respectively.

The ears 100 on the disc 96 rotatively support a cylindrical pin 132 which in turn is attached to a pendulum type valve means 138 by means of a depending strip 140. The valve means 138 is provided with oppositely directed conical portions 142 and 144 for effecting closure of the openings 128 and 130 respectively, and as will further appear. A bottom wall 148 of the ancillary tank is provided with openings 150 and 152 for communication with two short nipples 154 and 156 respectively. These nipples are attached to the wall 148 by welding and they extend downwardly in fluid tight relation within the two grommets 30 and 32 respectively.

The float 106 and the valve 66 operate similarly to the corresponding elements disclosed in the United States application Serial No. 457,495, filed September 21, 1954, in the name of Jesse E. Eshbaugh, and it suffices herein to state that the valve disc 70 normally seats on the ridge 80 until unseated by the presence of excess liquid within the tank 10 in which event such liquid is vented through the conduit 54. Liquid would cause the float 106 to bring about the venting by lifting the disc 70 from its seat on the ridge 80 through contact of the valve member 108 with the disc. Excessive vapor pressure would be vented through the port 72. The second chamber 104, in any event, would have a proper communication with an upper zone of the tank 10 by either of the spaced conduits 34 or 40 regardless of the inclination of the tank or the fluid level therein. The conduit 34, under given circumstances, would communicate with the top chamber 62 by way of the nipple 154, the chambers 114 and 116, the opening 102, the second chamber 104 and the port 72 or 78. The conduit 40, under other circumstances, would have access to the top chamber 62 by way of the nipple 156, the chambers 118 and 116, the opening 102, the second chamber 104 and the port 72 or 78. The conduit 34 or 40 would be effective dependent upon the positioning of the pendulum type valve means 138. If the tank 10 is mounted on a vehicle going up an incline, the effect of gravity would be to cause the pendulum type valve to swing counterclockwise, as viewed in the drawing, to close off the port 130. In such an event the conduit 34 would constitute the vent effective from the forward portion of the tank 10. If the vehicle were proceeding down hill, then the valve 138 would rotate a short arc and in a clockwise direction to close the port 128 in which event the conduit 40 would constitute the venting conduit from the rear portion of the tank 10.

With the arrangement shown, it will be appreciated that the ancillary chamber 50 including its interior structure and also the nipples 154 and 156 could be inserted into the tank through the opening 16 so that the nipples properly engage the grommets 30 and 32. Conduits 34 and 40 are easily distorted for insertion or removal from their supporting brackets 36 and 42. Because of these nipples, mounting or demounting of the assembly within the main tank 10 is easily undertaken.

I claim:

1. A tank vent structure including a main tank, an opening in the top of said main tank, an ancillary tank closing off and depending within said opening with a top chamber vented to the ambient air, a second chamber in said ancillary tank, a float in said second chamber, a port and valve controlling communications between said top and second chambers, said float being associated with said port and valve whereby high liquid level will open the latter, spaced conduit means connecting spaced bottom portions of said ancillary tank with opposite zones in the top of said main tank, and valve means movably mounted in said ancillary tank and positioned effectively to close one and open the other of said spaced conduit means when said main tank is inclined from a normal position.

2. A tank vent structure including a main tank, an opening at the top of said main tank, an ancillary tank supported within said opening with a top chamber provided with a vent leading to the ambient air, a second chamber in said ancillary tank, a spring loaded valve in said top chamber and arranged to control communication between said top and second chambers, a float mounted in said second chamber and arranged to open said valve when liquid is in said second chamber, spaced conduit means connecting spaced bottom portions of said ancillary tank with opposite zones in the top of said main tank, and valve means movably mounted in said ancillary tank and positioned effectively to close one and open the other of said spaced conduit means when said main tank is inclined from a normal position.

3. A tank vent structure including a main tank, an opening in the top of said main tank, an ancillary tank closing off and depending within said opening and having a top vented chamber, spaced conduit means connecting the bottom portion of said ancillary tank with spaced zones in said main tank, valve means mounted in said ancillary tank for free movement to close one and open the other of said conduit means when said main tank is inclined from a normal position and to open said conduit means when said main tank is normally positioned, a vent structure within said ancillary tank above said valve means and having two concentric vent openings communicating with said vented chamber, valves controlling said vent openings, a spring urging one of said valves into closed position and in a downward direction, and a float arranged to urge another of said valves into its closed position when liquid is present at a level to lift said float.

4. A tank vent structure including a main tank, an opening in the top of said main tank, a closure for said opening comprising an ancillary tank depending into said main tank, two partitions forming a top chamber and a second chamber in said ancillary tank, vent means for said top chamber, ports in said partitions, a spring loaded valve in said top chamber and arranged to control communication between said top and second chambers through one of said ports, a float in said second chamber and mounted to move said valve from its seat in the presence of excess liquid in said main tank, spaced conduit means connecting the bottom portion of said ancillary tank with opposite zones in the top of said main tank, pendulum type valve means movable in said ancillary tank effectively to close one and open the other of said spaced conduit means when said main tank is inclined from a normal position, and said spaced conduit means including resilient grommets effecting demountability of said ancillary tank from said main tank.

References Cited in the file of this patent

UNITED STATES PATENTS

| | | |
|---|---|---|
| 2,662,538 | Cervino et al. | Dec. 15, 1953 |
| 2,684,683 | Brown | July 27, 1954 |

FOREIGN PATENTS

| | | |
|---|---|---|
| 682,508 | Great Britain | Nov. 12, 1952 |